United States Patent [19]

McCoy

[11] Patent Number: 4,637,463
[45] Date of Patent: Jan. 20, 1987

[54] ECHO RANGING GUN

[76] Inventor: James N. McCoy, 5001 Ditto La., Wichita Falls, Tex. 76301

[21] Appl. No.: 636,992

[22] Filed: Aug. 2, 1984

[51] Int. Cl.$^4$ .................................. E21B 47/04
[52] U.S. Cl. ..................... 166/250; 166/64; 166/66; 181/113; 181/124; 367/908
[58] Field of Search .............. 166/64, 66, 97, 250; 181/102, 113, 124; 367/86, 908

[56] References Cited

U.S. PATENT DOCUMENTS

| | | | |
|---|---|---|---|
| 2,047,974 | 7/1936 | Lehr et al. | 177/352 |
| 2,156,519 | 5/1939 | Walker | 181/0.5 |
| 2,209,944 | 7/1940 | Walker | 181/105 |
| 2,560,911 | 7/1951 | Wolf | 367/908 |
| 2,776,563 | 1/1957 | Holbert | 166/66 |
| 2,914,686 | 11/1959 | Clements et al. | 367/908 |
| 2,993,554 | 7/1961 | Towell et al. | 367/908 |
| 3,316,997 | 5/1967 | McCoy | 181/0.5 |
| 3,915,256 | 10/1975 | McCoy | 181/102 |
| 3,958,217 | 5/1976 | Spinnler | 340/18 |
| 4,134,097 | 1/1979 | Cowles | 340/7 R |
| 4,318,298 | 3/1982 | Godbey et al. | 73/155 |
| 4,351,037 | 9/1982 | Scherbatskoy | 367/85 |
| 4,408,676 | 10/1983 | McCoy | 181/113 |
| 4,509,552 | 4/1985 | Eicher et al. | 367/908 |

FOREIGN PATENT DOCUMENTS 2031584  4/1980  United Kingdom ........... 181/113

Primary Examiner—James A. Leppink
Assistant Examiner—William P. Neuder
Attorney, Agent, or Firm—Richards, Harris, Medlock & Andrews

[57] ABSTRACT

An echo ranging gun (10) is disclosed which is useable with high pressure gas wells having gas pressure exceeding 15,000 psi. The gun (10) is connected to the needle valve (30) typically encountered on a well having high pressure. The needle valve can have a diameter as small as approximately ⅛ inch. The gun (10) has a passage (38) which is exposed to the gas in the wellbore (14) and a volume chamber (46). A poppet valve (56) is movable between open and closed positions in the volume chamber by rotating a wing handle (88) connected to a head (78) within the volume chamber (46) which has a ramp (80) to contact the poppet valve (56) to move the valve to the closed position. A bleed valve (112) is used to bleed the wellbore gas from the volume chamber to create a predetermined pressure differential between the passage (38) and volume chamber (46). Further rotation of the wing handle (88) causes the poppet valve (56) to be released from the ramp at a down step (86). The pressure differential causes the poppet valve (56) to rapidly move to the open position and the gas flow into the volume chamber (46) generates an acoustic event which passes through the needle valve (30) reflects off various objects down the borehole and returns through the needle valve (30) to be sensed by a microphone (144).

13 Claims, 4 Drawing Figures

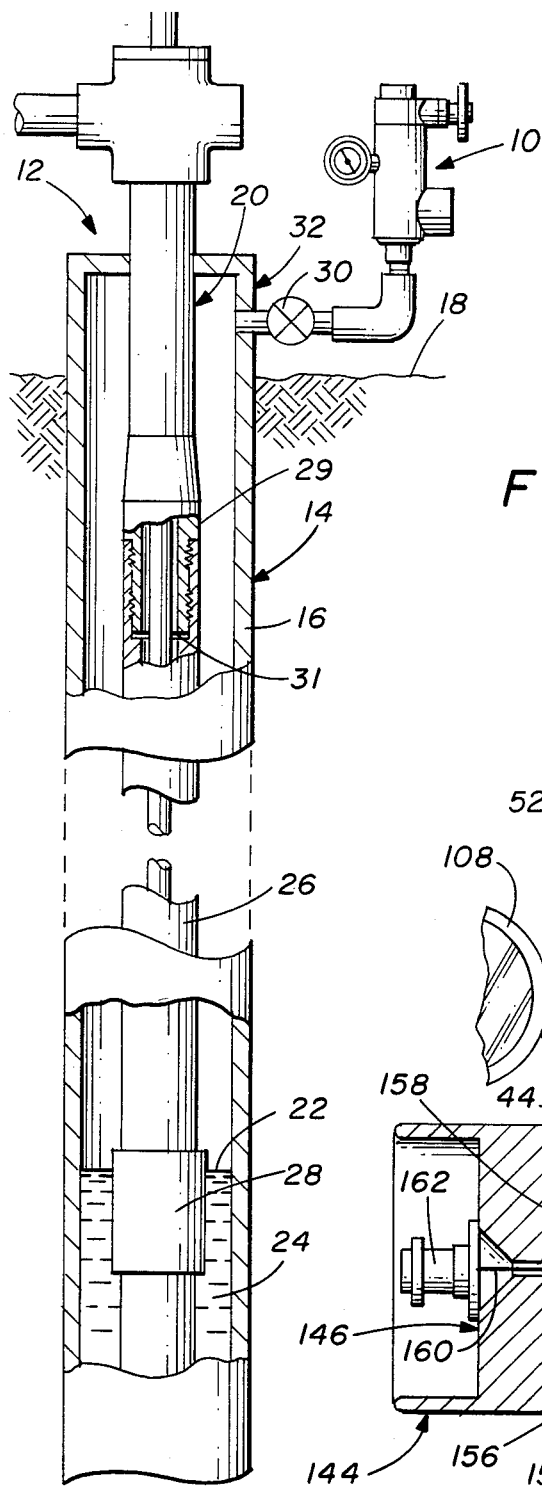
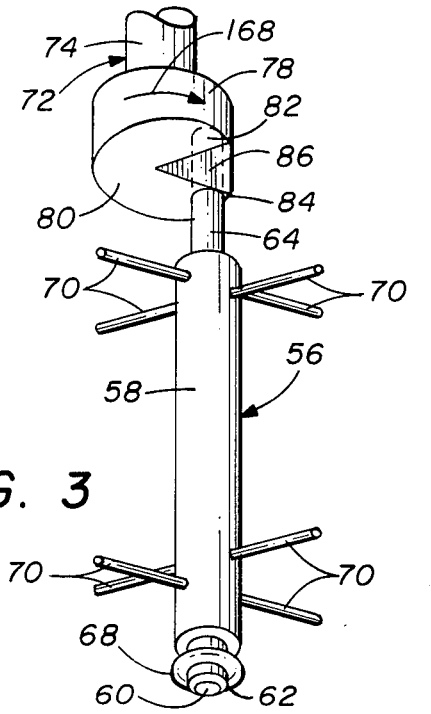
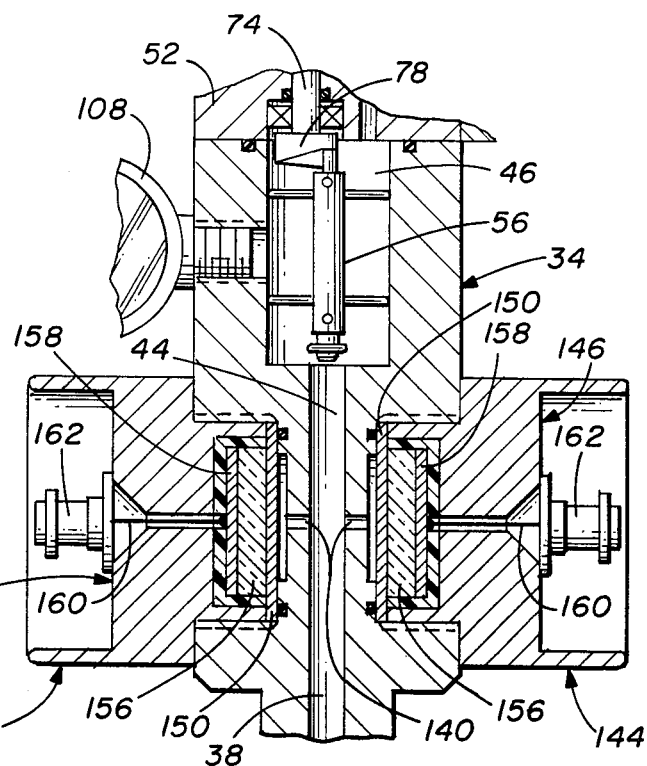
FIG. 1
FIG. 3
FIG. 4

ECHO RANGING GUN

TECHNICAL FIELD

This invention relates to the acoustic sensing of conditions within a wellbore, and in particular for sensing the depth of the liquid gas interface.

BACKGROUND ART

In a wellbore, particularly in an oil or gas well, it is often critical to determine the depth at which the liquid gas interface is located so that the pressure at the formation face can be determined. While pressure or fluid depth can be measured with a wireline tool, this involves a great deal of surface equipment and is quite expensive. In addition, the wellbore can also expose the wireline tools to hostile $CO_2$ and $H_2S$ environments with bottom hole temperatures approaching 500° F. The drawbacks involved with wireline testing have led to the development of acoustic ranging devices which generate a sonic impulse in the wellbore and then sense the acoustic reflections off various surfaces and objects, including the liquid gas interface.

Acoustic sensing devices have been developed which contain an explosive charge to generate the sonic event. An example of such a device is U.S. Pat. No. 3,915,256, issued on Oct. 28, 1975 to James N. McCoy. This device employs a common blank shotgun shell to generate the sonic event.

In a wellbore which has a substantial gas pressure, it is possible to use the gas pressure itself to create the sonic event. An example of a device of this type is U.S. Pat. No. 4,408,676, issued Oct. 11, 1983 to James N. McCoy. In this device, a valve is rapidly opened between a passage connected to the wellbore and a chamber at a lower pressure than the wellbore. This creates a sonic implosion which generates the sonic event.

While these devices and other devices in the industry have proved suitable in many applications, these devices are designed for use in wellbores having a pressure no higher than about 1500 psi. More recently, it has become desirable to sense the liquid gas interface in gas wells where the pressure may be of the order of about 15,000 psi. Also, in the past, the most successful test results have been made by sending a sonic impulse down the annulus between the casing and tubing therein. Therefore, reflections from internal tubing collars, especially close-makeup or flush couplings, could not be detected. A need exists for a device which is more sensitive than past instruments to detect flush connections and which is capable of operating at such elevated pressures while remaining economical and simple to use.

SUMMARY OF THE INVENTION

In accordance with one aspect of the present invention, a system is provided for sensing the depth of the liquid gas interface in the wellbore. The system includes a structure defining a volume chamber therein. The structure is adapted for connection to a well and the structure has a passage opening into the volume chamber at one end thereof and exposed to the wellbore at the other end thereof when the structure is connected to the well. A poppet valve is positioned in the volume chamber and is movable along a first axis between open and closed positions. The poppet valve has a sealing structure for isolating the volume chamber from the passage when the poppet valve is in the closed position. The sealing structure permits communication between the passage and volume chamber in the open position. A control is provided for moving the poppet valve to the closed position and rapidly releasing the poppet valve while in the closed position. A bleed valve is mounted in the structure and is in communication with the volume chamber and the atmosphere. The bleed valve is operable between open and closed positions. In the open position, gas in the volume chamber is released to the atmosphere to lower the pressure in the volume chamber. A sensor is used for sensing an acoustic event with the sensor being exposed to the pressure in the passage of the body. The poppet valve is initially in the open position so that the pressure in the valve chamber equals the borehole pressure. The poppet valve is subsequently moved to the closed position by the control and the bleed valve is opened to reduce the pressure in the volume chamber to a predetermined amount below the borehole pressure. The poppet valve then is released by the control permitting the poppet valve to be rapidly moved from the closed position to the open position by the differential pressure between the borehole and the volume chamber to generate the acoustical event.

In accordance with another aspect of the present invention, the poppet valve comprises a shaft having a diameter substantially equal to the diameter of the passage opening into the volume chamber. The shaft has a reduced diameter end portion having an O-ring groove about the periphery thereof and a bearing surface at the end of the shaft opposite the reduced diameter end portion. An O-ring seal is positioned in the O-ring groove with the O-ring sealing between the wall of the passage and the shaft when the poppet valve is in the closed position. A plurality of centering pins are attached to the shaft and extend radially outward therefrom to guide the shaft along the first axis.

In accordance with yet another aspect of the present invention, the poppet valve control is mounted in the structure for rotation relative thereto. The control extends into the volume chamber and defines a ramp with a gently sloped surface which extends from a foot to a crest for contacting the poppet valve. Rotation of the control in a first direction causes the poppet valve to ride up the gently sloped surface toward the crest to move the poppet valve to the closed position. Further movement of the control in the first direction releases the poppet valve from contact with the gently sloped surface and permits the poppet valve to return to the open position.

BRIEF DESCRIPTION OF THE DRAWINGS

A more complete understanding of the invention and its advantages will be apparent from the detailed description taken in conjunction with the accompanying drawings in which:

FIG. 1 illustrates a cross-sectional view of a typical wellbore and shows the placement of the echo ranging gun at the needle valve on the well;

FIG. 3 illustrates a perspective view of the poppet valve of the echo ranging gun and the ramp which permits the opening and closing of the poppet valve; and FIG. 4 illustrates a modification of the echo ranging gun which employs dual acoustical sensors.

DETAILED DESCRIPTION

Figure 2:
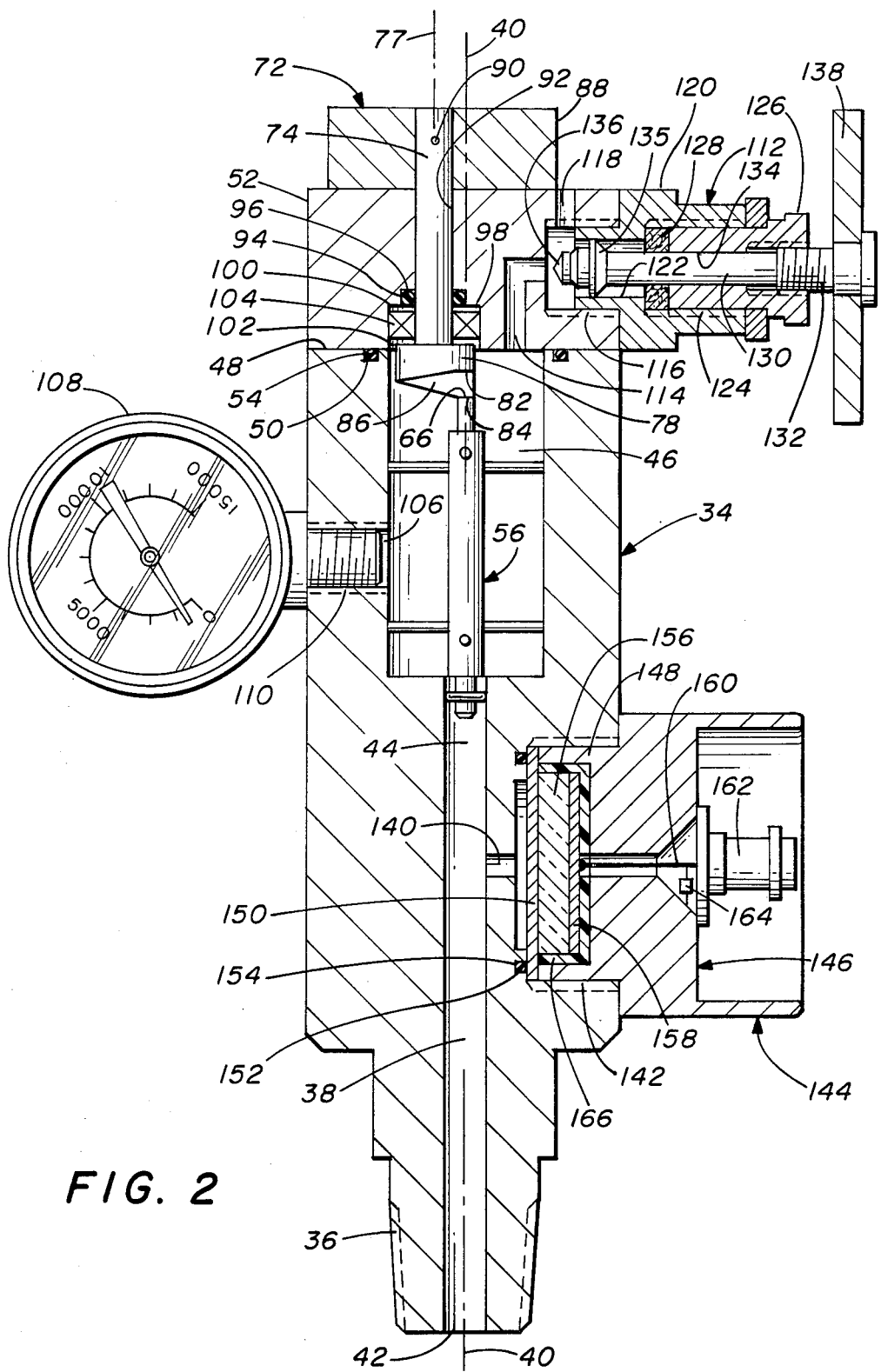
FIG. 2 illustrates a vertical cross-sectional view of the echo ranging gun.

With reference now to the drawings, where like reference numerals thereon correspond to the reference numerals used to identify structure identified hereafter, FIGS. 1-3 illustrate an echo ranging gun 10 forming one embodiment of the present invention.

With reference to FIG. 1, a well 12 is illustrated in cross section. The well 12 includes casing 14 which extends into the earth to a predetermined depth. The well 12 will typically be an oil or gas well, but can be any other type of well where the liquid gas interface depth is to be determined.

Casing 14 extends to the surface 18. A tubing string 20 extends through the casing 14 below the depth of the liquid gas interface 22 and is typically used for pumping liquid 24 from the well 12. Typically, the tubing string 20 is formed of a number of individual lengths of tube 26 which are connected by individual external collars 28 or internal flush couplings 29. External collars 28 such as shown in FIG. 1 readily reflect sonic events to a sensor device. However, it is quite common to find flush couplings 29 between tubes where no external collars are used. The flush couplings 29 comprise a threaded male end of one tube that is threaded into the female end of the adjacent tube. Only a small gap 31, perhaps a gap of only 0.015", separates the end of the male portion of one tube from the base of the female portion of the adjacent tube. A flush coupling does not reflect sonic events as readily as a collar and is correspondingly more difficult to locate in the wellbore by sonic methods.

If the well 12 is under high pressure due to gas within the well, the well will routinely include a high pressure needle valve 30 at the wellhead 32. Typically, valve 30 will be comprised of 316 stainless steel to resist the highly corrosive gases within the well. Usually, the needle valve 30 provides access for a pressure gauge which is used to monitor the gas pressure at the wellhead. The orifice in the needle valve 30 can be as small as $\frac{1}{8}$ inch in diameter.

The echo ranging gun 10 can be mounted on the needle valve 30 in substitution for the pressure gauge normally positioned there. The gun 10 will generate a sonic event which can be directed either downward in the annulus between casing 14 and tubing string 20 as shown or down the interior of tubing string 20. The sonic event reflects off of various surfaces in the wellbore. Reflected sonic disturbances are sensed by a microphone in gun 10. The signal vibrations sensed by the microphone can be analyzed to determine the positions of various elements in the wellbore. For example, the level of corrosion protection liquids in the casing annulus can be found. In addition, downhole obstructions and anomalies can be located.

As can be seen in FIG. 2, the echo ranging gun 10 includes a body 34 which has a threaded nipple 36 at one end thereof for threading into the needle valve 30 as seen in FIG. 1. A passage 38 is formed in the body 34 which is centered generally along axis 40 which forms the axis of symmetry for the body 34. It will be apparent that the end 42 of passage 38 will be exposed to the gas pressure within the wellbore 14 if the needle valve 30 is opened. The opposite end 44 of the passage 38 opens into a larger diameter volume chamber 46. The volume chamber extends through the end 48 of the body 34 opposite the nipple 36. An O-ring groove 50 is formed in end 48 centered on the axis 40. A cap 52 is secured over the end 48 by bolts or other fasteners with an O-ring 54 positioned in the groove 50 to seal the volume chamber 46.

A poppet valve 56 is positioned within the volume chamber 46. As best seen in FIGS. 2 and 3, the poppet valve 56 includes a round shaft 58 of diameter comparable with the diameter of passage 38. Poppet valve 56 also has a reduced diameter end portion 60 which includes an O-ring groove 62. A reduced diameter end portion 64 is provided opposite end portion 60 which includes a bearing face 66 at the end thereof. The poppet valve 56 also includes an O-ring 68 which rests within the O-ring groove 62 and acts to seal against the wall of passage 38 at end 44, as will be discussed hereinafter, to isolate the passage 38 from the volume chamber 46. A number of centering pins 70 extend radially outward from the shaft 58 to center the poppet valve along the first axis 40 and permit the poppet valve to move along the first axis from a closed position, such as seen in FIG. 2, to the open position seen in FIG. 4. In one echo ranging gun constructed in accordance with the teachings of the present invention, the round shaft 58 had a $\frac{1}{4}$ inch diameter and four centering pins 70 were positioned at each end of the shaft 58 which had a diameter of about 1/16 th inch and a length of approximately one inch.

A poppet valve control assembly 72 is mounted on the cap 52 and extends into the volume chamber. The assembly 72 includes a shaft 74 mounted for rotation about a second axis 77 in the cap 52. The second axis 77 is parallel the first axis 40 but is spaced therefrom a predetermined distance. The end of the shaft 74 extending into the volume chamber 46 has an enlarged diameter head 78 on which is defined a ramp 80 which extends from a foot 82 to a crest 84 as best seen in FIG. 3. A down step 86 is formed between the foot and crest of the ramp. The end of shaft 74 extending out of the cap 52 mounts a wing handle 88 which is pinned to the end of the shaft by a pin 90. The aperture 92 formed through the cap 52 for passage of the shaft 74 includes an O-ring groove 94 which accepts an O-ring 96 to seal between the shaft 74 and cap 52. Preferably, the clearance between shaft 74 and aperture 92 is approximately 0.001". A high durometer (hardness) O-ring is used for O-ring 96. A thrust bearing 98 is positioned within a recess 100 of the cap 52 as shown. The thrust bearing includes circular washers 102 with a plurality of ball bearings 104 positioned therebetween. Roller bearings can be used instead of ball bearings, if desired. Preferably, the components of thrust bearing 98 are formed of a soft stainless steel to resist the corrosive effects of the wellbore gases. As can be readily seen, the head 78 can be rotated about the second axis 77 by rotating the wing handle 88 while the head 78 is supported by the thrust bearing 98 so that the control assembly 72 can be rotated despite the presence of large forces caused by high pressure in the volume chamber 46 which act to push shift 74 outward.

If desired, control assembly 72 can be substituted for by a shaft rotatable in body 34 about an axis perpendicular to axis 40 with a cam secured along the shaft for contact with bearing face 66. The outer surface of the cam lies on a helical path to close poppet valve 56 and rapidly release it upon rotation of the shaft and cam.

A female pipe thread 106 is formed in the body 34 which opens into the volume chamber 46. A pressure gauge 108 having male pipe thread 110 is threaded into the body to monitor the pressure within the volume chamber 46.

A relief valve assembly 112 is mounted within cap 52 for bleeding the pressure within the volume chamber 46 to the atmosphere. The assembly includes a port 114 formed in the cap which opens into a threaded aperture 116. A second port 118 extends from a sidewall of the aperture 116 to the atmosphere. A first member 120 is threaded into the aperture 116 and includes a small diameter aperture 122 and a larger diameter aperture 124 which is threaded. A second member 126 is threaded into the first member 120 with a valve packing 128 being squeezed between the end of the second member 126 and the wall of the first member formed between the apertures 122 and 124. A valve stem 130 is, in turn, threaded into a threaded aperture 132 in the second member 126. The valve stem continues through a nonthreaded aperture 134 in the second member 126, extends into smaller diameter aperture 122 where it defines a holding valve 135, and ends with a conical seal face 136. A handle 138 is secured on the valve stem 130 which permits the valve stem to be rotated in one direction so that the conical seal face 136 can be moved against the opening of port 114 to close the port 114 and prevent flow from port 114 to port 118 and thus to the atmosphere. However, the handle 138 can be rotated in the opposite direction to move the seal face 136 away from port 114 to permit pressurized gas from the volume chamber 146 to be bled to the atmosphere.

A second passage 140 branches off of the passage 38 and opens into a threaded aperture 142. The aperture 142 forms a mounting position for the microphone 144. The microphone 144 comprises a microphone housing 146 which has a threaded portion 148 for engaging the threaded aperture 142. A stainless steel plate 150 fits between the housing 146 and the aperture 142 to seal the passage 140. An O-ring groove 152 is formed at the bottom of the aperture 142 which receives an O-ring 154. When the housing 146 is threaded into the aperture 142, the housing 146 urges the stainless steel plate 150 against the O-ring 154 to prevent any gases in the passage 140 from seeping about the edges of the stainless steel plate 150.

Behind the stainless steel plate 150 is located a transducer 156, preferably formed of a ceramic crystal. The transducer 156 is sensitive to sonic disturbances in the passages 140 and 38 from the wellbore 14 which are generated by the echo ranging gun 10 in a manner described hereinafter. The stainless steel plate 150 permits transmission of the acoustic vibrations to the transducer 156, yet protects the transducer from the corrosive and destructive gas within the wellbore. The transducer 156 generates electrical signals in response to acoustic vibrations from passage 38 and 140. A brass plate 158 is positioned behind the transducer to conduct the electrical signals from transducer 156. A signal wire 160 extends from the back of the brass plate 158 to the electrical connector 162 on the housing 146 to conduct the electrical signals to external amplifying, filtering and recording equipment. The connector 162 is preferably a common BNC type connector, but can be any connector desired. A varistor 164 is connected between the signal wire 160 and a ground in order to bleed high voltage signals from the signal wire 160. In one design constructed with the teachings of the present invention, a varistor was used which bled voltages in excess of 20 volts to ground. The transducer 156 and brass plate 158 are prevented from shorting to the housing 146 by an electrical insulator 166. Electrical insulator 166 is preferably formed of mylar and has a thickness of approximately 0.020 inches.

The operation of the echo ranging gun 10 will now be described. The echo ranging gun 10 will first be secured to the needle valve 30 with the needle valve being closed. The wing handle 88 is rotated so that the foot 82 of the ramp 80 is presented to the bearing face 66 on the poppet valve 56. The relief valve assembly 112 is closed to isolate the volume chamber 46 from the atmosphere.

When the test is to be taken, the needle valve 30 is open, permitting the pressurized gas in the casing 14 to enter the passages 38, 140 and volume chamber 46. The pressure in the volume chamber 46 therefore equals the pressure at the wellhead 32. The wing handle 88 is then rotated in a first direction about the second axis 77 as shown by arrow 168 in FIG. 3. This moves the poppet valve 56, through contact between ramp 80 and bearing surface 66, until poppet valve 56 is moved to the closed position where the O-ring 68 seals between the inside of the passage 38 at end 44 and the shaft 74 to isolate the passage 38 from the volume chamber 46 and prevent gas flow therebetween.

The bleed valve assembly 112 is then opened slightly to reduce the pressure in the volume chamber 46 below the well pressure. The well pressure is measured on the pressure gauge 108 prior to opening bleed valve assembly 112 and the gauge 108 can be used to monitor the pressure reduction in the volume chamber 46 as the bleed valve assembly is opened. In the preferred embodiment, the volume chamber pressure is reduced to about 500 to 1500 psi below the well pressure.

The wing handle 88 is again rotated in the direction of arrow 168 to move the crest 84 of ramp 80 past the bearing face 66 of the poppet valve 56. As the crest 84 passes the bearing face 66, the poppet valve control assembly 72 no longer maintains the poppet valve 56 in a closed position and the pressure differential built up between the passage 38 and volume chamber 46 violently drives the poppet valve 56 to the open position as seen in FIG. 4. The higher pressure gas from the wellbore 14 creates an implosion or rarefaction pressure pulse which generates an acoustic event or pressure wave which travels through the passage 38, through the needle valve 30 and down the wellbore 14. As this acoustic pulse reflects off various surfaces in the wellbore, such as collars 28 and the liquid gas interface 22, reflected pressure pulses are generated which go upward in the casing 14, through passage 38 and impact upon the stainless steel plate 150 to generate electrical pulses within the transducer 156. As this occurs, the electrical pulses generated in a transducer 156 are transferred through the signal line to various amplifiers and noise filters for recording on a strip chart.

The distance to the liquid gas interface 22 or any other anomaly, such as a blockage in the casing 14, can be determined by three separate techniques using the echo range gun 10. First, the distance to the liquid gas interface 22 or anomaly can be determined by multiplying the average length of the tubing sections 26 by the number of reflections recorded off of the collars 28 or flush couplings 29 which are quite distinct on the chart recording the electrical impulses from the transducer 156. Excellent results have been obtained down the inside of flush tubing for a gap 31 of only 0.015". Second, the distance from the liquid gas interface or the anomaly of interest can be determined by multiplying the travel time to the interface 22 or anomaly of interest by the distance to a known anomaly, divided by the time to the known anomaly. The known anomaly can, for example, be formed by a mandrel, "R" nipple, upper perforations, an obstruction or a marker. A change in the cross-sectional area of the wellbore will cause a reflection which can be used as a marker. Finally, a new technique has been developed which permits calculation of the distance to the interface 22 or anomaly by simply measuring the travel time it takes for the sonic pulse to travel to the interface or anomaly and return to the transducer 156. If the travel time is known, and the composition and temperature of the gas within the casing 14 is known, gas equations are available for calculating the speed of the sonic wave travel for a given pressure and temperature in the gas by portable computer. This permits calculation of the position of the interface or anomaly. Also, the portable computer will calculate pressures at various depths knowing gas composition, surface temperatures, downhole temperatures and surface pressure.

Once tests are completed, the gun 10 can be readily removed from neddle valve 30. First, the valve 30 should be closed. Then, with poppet valve 56 free to move to the open position, bleed valve assembly 112 should be opened to relieve pressure from gun 10.

The echo ranging gun 10 has a number of advantages over the ranging devices known previously. The echo ranging gun 10 is adapted to be used successfully to wellbore pressures in excess of 15,000 psi. The gun 10 can also be employed with the needle valve 30 which is already present at the wellhead 32. The gun 10 can generate an effective acoustical event which will travel through the needle valve 30 even though the volume of chamber 46 is very small compared to prior art devices. Even if the opening in the needle valve 30 is as small as ⅛th inch in diameter, this opening is sufficient for transmission of the relatively high frequency acoustic signals generated by gun 10 to wellbore 14 and for transmission of the acoustic signals reflected from the wellbore 14 to the transducer 156. As a result of the relatively small volume in chamber 46 in the gun 10 compared to prior devices, the entire gun is much smaller than the prior devices. In fact, previous devices are typically ten times as large and as heavy as the gun 10. The design of gun 10 is such that a low yield strength corrosion resistant stainless steel, such as 304 stainless steel (having a hardness of less than 22 on the Rockwall "C" scale), can be used rather than harder materials which are more susceptible to corrosion and embrittlement. The reduction in size of the gun 10 greatly decreases the cost of the gun 10 relative to the prior devices.

Another advantage in operation is the fact that the poppet valve 56 is not closed against any external forces during use. When the poppet valve 56 is moved into the closed position, the pressures in the passage 38 and in the volume chamber 46 are equal. When a pressure differential across the poppet valve 56 is created by bleeding gas to the atmosphere from chamber 46, all that is necessary is to rotate the wing handle 88 slightly to release the poppet valve from the ramp 80 to generate the acoustic event.

In the particular area of determining bottom hole pressure, the common technique used is a bottom hole pressure bomb lowered on a wireline. This involves use of a lubricator and surface wireline equipment. This equipment must be tested and the possibility of wireline failure always exists, perhaps requiring an expensive fishing job to recover the lost instrument. This results in an expensive measurement technique, commonly costing about $15,000 per test. The hazards and expense of running these tests have resulted in many operators failing to obtain sufficient downhole pressure information to know the well characteristics and determine the reservoir performance. The sensing of bottom hole pressure by use of gun 10 is a much safer and less expensive technique. A portable computer can be used to determine both producing and static bottom hole pressures by using the relevant equations of gas composition and temperature and the information generated by the gun 10. The cost of running a test would be expected to be less than $100.

A modification of the echo ranging gun 10 is illustrated in FIG. 4. In the modification, two microphones 144 are employed which are positioned on opposite sides of the body 34. Voltages generated in the transducers 156 from acoustic vibrations within the casing 14 result in an output from each microphone of the same polarity. When the body 34 is vibrated in the direction of the mounting of the microphones, generally transverse to the direction of the axis 40, the signals are of opposite polarity and cancel each other, reducing the noise level of the signals generated.

While one embodiment of the present invention has been described in detail herein and shown in the accompanying Drawings, it will be evident that various further modifications are possible without departing from the spirit and scope of the invention.

I claim:

1. A system for sensing the depth of a liquid gas interface in the wellbore, comprising:

a structure defining a volume chamber therein, said structure being adapted for connection to the well and said structure having a passage opening into the volume chamber at one end thereof and exposed to the wellbore gas pressure at the other end thereof when the structure is connected to the well;

a poppet valve positoned in said volume chamber and movable along a first axis between open and closed positions, the poppet valve having sealing means for isolating the passage and volume chamber to prevent gas flow therebetween when said poppet valve is in the closed position, said poppet valve permitting gas flow between the passage and the volume chamber in the open position;

mean for moving the poppet valve to the closed position and for rapidly releasing the poppet valve while in the closed position for movement to the open positions;

a bleed valve mounted in said structure in communication with said volume chamber and the atmosphere which is operable between open and closed positions to permit gas in the volume chamber to be released to the atmosphere in the open position to lower the pressure in the volume chamber while preventing gas flow from the volume chamber to the atmosphere in the closed position;

a microphone for sensing acoustic disturbances, said microphone being exposed to the gas pressure in the passage of said structure; and the poppet valve initially being in the open position so that the pressure in the volume chamber equals the pressure in the wellbore, the poppet valve subsequently being moved to the closed position by said moving means and said bleed valve being open to reduce the pressure in the volume chamber a predetermined amount below the pressure in the wellbore, said means for moving subsequently rapidly releasing the poppet valve so that the pressure differential between the passage and volume chamber drives the poppet valve to the open position and generates an acoustic event for transmittal through the passage to the wellbore with reflective acoustic signals being transmitted from the wellbore through the passage to the microphone for sensing of the depth of the liquid gas interface;

the poppet valve comprising a shaft having a first end portion with an O-ring groove formed therein and a bearing surface at the second end portion of the shaft opposite the first end portion for contacting by said moving means;

an O-ring seal positioned in the O-ring groove, the O-ring sealing between the wall of the passage and the shaft when the poppet valve is in the closed position; and a plurality of centering pins attached to said shaft and extending radially outwardly therefrom to guide the shaft and O-ring seal for movement along the first axis.

2. A system for sensing the depth of a liquid gas interface in the wellbore, comprising:

a structure defining a volume chamber therein, said structure being adapted for connection to the well and said structure having a passage opening into the volume chamber at one end thereof and exposed to the wellbore gas pressure at the other end thereof when the structure is connected to the well;

a poppet valve positioned in said volume chamber and movable along a first axis between open and closed positions, the poppet valve having sealing means for isolating the passage and volume chamber to prevent gas flow therebetween when said poppet valve is in the closed position, said poppet valve permitting gas flow between the passage and the volume chamber in the open positions;

means for moving the poppet valve to the closed position and for rapidly releasing the poppet valve while in the closed position for movement to the open position;

a bleed valve mounted in said structure in communication with said volume chamber and the atmosphere which is operable between open and closed positions to permit gas in the volume chamber to be released to the atmosphere in the open position to lower the pressure in the volume chamber while preventing gas flow from the volume chamber to the atmosphere in the closed position;

a micrphone for sensing acoustic disturbances, said microphone being exposed to the gas pressure in the passage of said structure;

the poppet valve initially being in the open position so that the pressure in the volume chamber equals the pressure in the wellbore, the poppet valve subsequently being moved to the closed position by said moving means and said bleed valve being open to reduce the pressure in the volume chamber a predetermined amount below the pressure in the wellbore, said means for moving subsequently rapidly releasing the poppet valve so that the pressure differential between the passage and volume chamber drives the poppet valve to the open position and generates an acoustic event for transmittal through the passage to the wellbore with reflective acoustic signals being transmitted from the wellbore through the passage to the microphone for sensing of the depth of the liquid gas interface;

said moving means comprising a poppet valve control mounted in said structure for rotation in relation thereto, said poppet valve control including:

a head extending into the volume chamber and defining a ramp with a sloped surface which extends from a foot to a crest for contacting said poppet valve so that rotation of the head in a first direction causes the poppet valve to ride up the sloped surface toward the crest and move the poppet valve into the closed position, further movement of the head in the first direction releasing the poppet valve from contact with the sloped surface to permit the poppet valve to move to the open position.

3. The system of claim 2 wherein said head is attached to a shaft extending through a portion of said structure and exterior of said structure, a wing handle being mounted to said shaft exterior of said structure for rotating the head about a second axis parallel the first axis and spaced therefrom, said head being supported on said structure by a thrust bearing comprising two annular plates separated by bearings.

4. A system for sensing the depth of a liquid gas interface in the wellbore, comprising:

a structure defining a volume chamber therein, said structure being adapted for connection to the well and said structure having a passage opening into the volume chamber at one end thereof and exposed to the wellbore gas pressure at the other end thereof when the structure is connected to the well;

a poppet valve positioned in said volume chamber and movable along a first axis between open and closed positions, the poppet valve having sealing means for isolating the passage in volume chamber to prevent gas flow therebetween when said poppet valve is in the closed position, said poppet valve permitting gas flow between the passage and the volume chamber in the open position;

means for moving the poppet valve to the closed position and for rapidly releasing the poppet valve while in the closed position for movement to the open positions;

a bleed valve mounted in said structure in communication with said volume chamber and the atmosphere which is operable between open and closed positions to permit gas in the volume chamber to be released to the atmosphere in the open position to lower the pressure in the volume chamber while preventing gas flow from the volume chamber to the atmosphere in the closed position;

a microphone for sensing acoustic disturbances, said microphone being exposed to the gas pressure in the passage of said structure; and the poppet valve initially being in the open position so that the pressure in the volume chamber equals the pressure in the wellbore, the poppet valve subsequently being moved to the closed position by said moving means and said bleed valve being opened to reduce the pressure in the volume chamber a predetermined amount below the pressure in the wellbore, said means for moving subsequently rapidly releasing the poppet valve so that the pressure differential between the passage and volume chamber drives the poppet valve to the open position and generates an acoustic event for transmittal through the passage to the wellbore with reflective acoustic signals being transmitted from the wellbore through the passage to the microphone for sensing of the depth of the liquid gas interface;

said microphone comprising a stainless steel plate exposed to the gas in said passage, a transducer positioned behind said stainless steel plate and isolated from the gas in the passage and electrically conductive means for transmitting the signals generated by the transducer in response to acoustic signals passing through the stainless steel plate.

5. A system for sensing the depth of a liquid gas interface in a wellbore, comprising:

a body having a passage formed therein extending from one face to a region within said body, said passage being centered on a first axis and a volume chamber formed in an opposite face extending into the body and intersecting said passage, said volume chamber also being centered on the first axis;

a cap adapted for attachment to the body over the volume chamber and having a aperture therethrough centered on a second axis parallel the first axis but offset therefrom;

a poppet valve positioned in said volume chamber for movement along the first axis between closed and opened positions and having a gasket means at the end thereof proximate the passage for sealing the passage from the volume chamber in the closed position;

a poppet valve control having a member extending into the volume chamber defining a ramp surface thereon, said control being mounted through the aperture in said cap for rotation about the second axis, rotation of the control in a first direction causing the poppet valve to move to the closed position through contact between the ramp and poppet valve, further rotation of the control causing the poppet valve to be released from contact with the ramp for movement to the open position unrestricted by the control;

means for bleeding gas from the volume chamber; and the system operating by permitting gas from the wellbore to enter the passage and volume chamber with the poppet valve open, subsequently rotating said control to close the poppet valve and bleeding sufficent gas from the volume chamber to provide a predetermined pressure differential between the passage and volume chamber and further rotating the control to permit the poppet valve to be driven to the open position to generate an acoustic event.

6. The system of claim 5 further comprising a microphone, said microphone including:

a stainless steel plate exposed to the passage in the body, a transducer attached to the stainless steel plate and isolated from the passage, acoustic vibrations being transmitted from the gas in the passage through the stainless steel plate to the transducer and causing said transducer to generate electrical signals in response to the vibration;

a brass plate secured to said transducer;

a signal wire extending from said brass plate for transmitting the electrical signals generated by the transducer;

a varistor connected between said signal wire and a ground to pass signals from the signal wire exceeding approximately 20 volts; and an electrical insulator to protect the transducer and brass plate from grounding to the body.

7. The system of claim 5 wherein said poppet valve comprises a shaft having a reduced diameter at one end with an O-ring groove about the periphery thereof;

said gasket means comprising an O-ring seal positioned in the O-ring groove, the O-ring sealing between the wall of the passage and the shaft when the poppet valve is in the closed position to isolate the volume chamber from the passage; and a plurality of centering pins attached to said shaft and extending transverse to the first axis to guide the shaft and O-ring seal along the first axis.

8. The system of claim 5 wherein the gas from the wellbore passes through a needle valve at the wellhead for entry into the passage and the acoustic event is transmitted through the needle valve to the wellbore, said needle valve having a diameter of at least approximately ⅛ inch.

9. The system of claim 5 further having means for measuring the pressure within the volume chamber so that the predetermined pressure differential between the passage and volume chamber can be created.

10. The system of claim 5 being designed for gas pressures at the wellhead at least to 15,000 psi.

11. The system of claim 5 wherein said control further comprises a shaft extending through the passage in said cap and outside the cap, a wing handle being secured on the shaft to permit rotation on the shaft, said aperture in the cap having an O-ring groove for receiving an O-ring to seal between the cap and the shaft, said head being supported by a thrust bearing on the cap, said thrust bearing comprising two stainless steel annular members with stainless steel ball bearings positioned therebetween.

12. A system for sensing conditions within a wellbore from a needle valve positioned at the wellhead of the well, the needle valve having a diameter of at least approximately ⅛" comprising:

a body having a first and second end, a passage extending from the first surface into the body and centered along a first axis, a volume chamber formed through the second end and extending into the body to the passage, said volume chamber also centered on the first axis;

a cap having an aperture therethrough, said cap being adapted for sealing engagement with the second end of the body over the volume chamber, said aperture opening into the volume chamber;

a poppet valve positioned in the volume chamber including a shaft having a reduced diameter end portion with an O-ring groove about the periphery thereof and a bearing surface at the end of the shaft opposite the reduced diameter end portion, an O-ring seal positioned in the O-ring groove, the poppet valve being movable along the first axis between a closed and opened position, said O-ring sealing between the wall of the passage and the shaft when the poppet valve is in the closed position to isolate the volume chamber from the passage and a plurality of centering pins attached to said shaft and extending radially outwardly therefrom to contact the walls of the volume chamber to guide the shaft and O-ring seal along the first axis;

a pressure gauge for mounting on the body for measuring the pressure in the volume chamber;

a second passage branching from the first passage and opening into a threaded aperture in the body;

a microphone being threadedly engaged in said threaded aperture, said microphone including a stainless steel plate exposed to said second passage, a transducer secured to the side of said stainless steel plate away from the passage and isolated from the second passage, a brass plate secured to said transducer, a signal wire extending from the brass plate for transmitting electrical signals generated in the transducer in response to acoustic vibration and a high voltage varistor for limiting the voltage transmitted along the signal wire;

a bleed valve mounted in said cap, said bleed valve having a valve stem, said cap having an opening into the volume chamber and extending proximate the valve stem, the valve stem being movable to block the port to prevent gas from escaping from the volume chamber to the atmosphere and movable away from the port to bleed gas from the volume chamber to the atmosphere;

a poppet valve control including a shaft mounted for rotation about a second axis in the aperture in the cap, said cap having an O-ring groove for receiving an O-ring to seal between the shaft and cap for preventing gas leakage from the volume chamber to the atmosphere, a wing handle being positioned on the end of the shaft extending from the cap for rotating the shaft, an enlarged diameter head attached at the end of the shaft opposite the wing handle and extending into the volume chamber, said head forming a ramp thereon for contacting the bearing surface on said poppet valve, rotation of the wing handle in a first direction causing the ramp to contact the bearing surface of the poppet valve to move the poppet valve into the closed position, the bleed valve subsequently being opened to permit sufficient gas to escape from the valve chamber to the atmosphere to create a predetermined pressure differential between the passage and volume chamber, subsequent rotation of the wing handle in the first direction releasing the poppet valve to move to the open position, thereby creating an acoustic event which is transmitted through the needle valve to the wellbore with acoustic reflections passing from the wellbore through the needle valve to the microphone to generate electrical signals corresponding to the acoustic reflections, the system being operable for gas pressures up to at least 15,000 psi.

13. A method for sensing a condition in a wellbore where the gas pressure in the wellbore can exceed 15,000 psi, comprising the steps of:

providing gas from the wellbore to a passage in a volume chamber formed within a structure;

isolating the passage from the volume chamber with a poppet valve;

bleeding a quantity of the gas in the volume chamber to the atmosphere to establish a predetermined pressure differential between the passage and the volume chamber;

releasing the poppet valve so that the pressure differential causes the valve to open, permitting the volume chamber to create an acoustic event which passes through the passage into the wellbore, reflects from structures within the wellbore and reflects back through the passage;

sensing the reflected acoustic signals in the passage with a microphone, said microphone having a stainless steel plate exposed to the passage and a transducer secured on the side of the stainless steel plate opposite the passage to protect the transducer from the gas passage, said transducer generating electrical signals in response to vibration of the stainless steel plate by the reflected acoustic signals; and rotating a poppet valve control having a ramp formed thereon, the poppet valve contacting the ramp so that rotation of the control causes the poppet valve to move to the closed position, the ramp having a step down so that continued rotation of the control permits the poppet valve to freely move from the closed position to the open position under the influence of the pressure differential between the passage and the volume chamber.

* * * * *